United States Patent
Bradski et al.

(10) Patent No.: US 11,379,992 B2
(45) Date of Patent: Jul. 5, 2022

(54) PATCH EXPANSION FOR SEGMENTATION NETWORK TRAINING

(71) Applicant: Matterport, Inc., Sunnyvale, CA (US)

(72) Inventors: Gary Bradski, Palo Alto, CA (US); Prasanna Krishnasamy, Mountain View, CA (US); Mona Fathollahi, Sunnyvale, CA (US); Michael Tetelman, Los Gatos, CA (US)

(73) Assignee: Matterport, Inc., Sunnyvale, CA (US)

( * ) Notice: Subject to any disclaimer, the term of this patent is extended or adjusted under 35 U.S.C. 154(b) by 257 days.

(21) Appl. No.: 16/412,183

(22) Filed: May 14, 2019

(65) Prior Publication Data

US 2020/0364878 A1 Nov. 19, 2020

(51) Int. Cl.
G06K 9/34 (2006.01)
G06T 7/194 (2017.01)
G06N 3/08 (2006.01)
G06T 11/00 (2006.01)
G06T 7/11 (2017.01)

(52) U.S. Cl.
CPC .............. *G06T 7/194* (2017.01); *G06N 3/08* (2013.01); *G06T 7/11* (2017.01); *G06T 11/001* (2013.01)

(58) Field of Classification Search
CPC ......... G06T 7/194; G06T 11/001; G06T 7/11; G06T 2207/20104; G06T 2207/20081; G06T 2207/20084; G06N 3/08; G06N 3/0454; G06N 3/084
See application file for complete search history.

(56) References Cited

U.S. PATENT DOCUMENTS

| | | | |
|---|---|---|---|
| 8,175,384 B1 | 5/2012 | Wang | |
| 8,386,964 B2 | 2/2013 | Sun et al. | |
| 8,452,087 B2 | 5/2013 | Sun et al. | |
| 8,548,251 B2 | 10/2013 | Pettigrew et al. | |
| 8,670,615 B2 | 3/2014 | Piramuthu et al. | |
| 9,773,196 B2 | 9/2017 | Sachs et al. | |
| 2006/0239548 A1* | 10/2006 | George Gallafent | ... G06T 7/194 382/164 |
| 2015/0170005 A1 | 6/2015 | Cohen et al. | |

(Continued)

FOREIGN PATENT DOCUMENTS

| | | | |
|---|---|---|---|
| GB | 2426903 | * | 12/2006 |
| WO | 20060092542 | | 9/2006 |

OTHER PUBLICATIONS

Bearman, Amy et al., "What's the Point: Semantic Segmentation with Point Supervision" Springer International Publishing AG 2016, pp. 549-565.*

(Continued)

*Primary Examiner* — Samir A Ahmed
(74) *Attorney, Agent, or Firm* — Ahmann Kloke LLP

(57) ABSTRACT

Systems and methods for frame and scene segmentation are disclosed herein. One method includes associating a first primary element from a first frame with a background tag, associating a second primary element from the first frame with a subject tag, generating a background texture using the first primary element, generating a foreground texture using the second primary element, and combining the background texture and the foreground texture into a synthesized frame. The method also includes training a segmentation network using the background tag, the foreground tag, and the synthesized frame.

30 Claims, 5 Drawing Sheets

(56) References Cited

U.S. PATENT DOCUMENTS

| | | | |
|---|---|---|---|
| 2016/0062615 A1 | 3/2016 | Price et al. | |
| 2016/0093101 A1* | 3/2016 | Benedek | G06T 7/194 |
| | | | 345/420 |
| 2017/0039723 A1 | 2/2017 | Price et al. | |
| 2019/0236371 A1* | 8/2019 | Boonmee | G06K 9/00765 |
| 2019/0361994 A1* | 11/2019 | Shen | G06N 3/08 |
| 2020/0134833 A1* | 4/2020 | Biswas | G06K 9/342 |
| 2020/0143171 A1* | 5/2020 | Lee | G06K 9/00744 |
| 2020/0342652 A1* | 10/2020 | Rowell | G06K 9/6256 |
| 2020/0364873 A1* | 11/2020 | Bradski | G06T 5/20 |
| 2021/0019528 A1* | 1/2021 | Ghadyali | G05B 13/048 |
| 2021/0248408 A1* | 8/2021 | Deng | G06K 9/6267 |

OTHER PUBLICATIONS

K. Maninis, et al., Video Object Segmentation Without Temporal Information, arXiv:1709.06031v2, May 16, 2018, 15 pages.

V. Badrinarayanan, et al., SegNet: A Deep Convolutional Encoder-Decoder Architecture for Robust Semantic Pixel-Wise Labelling, CVPR' 15, 1468, Nov. 14, 2014, 10 pages.

Y. Boykov, et al., Interactive Graph Cuts for Optimal Boundary & Region Segmentation of Objects in N-D Images, Proc. Int. Conf. on Computer Vision, vol. I, p. 105, Vancouver, Canada, Jul. 2001, 8 pages.

* cited by examiner

300

Original Image 301

Segmentation 302

US Error Region 303

OS Error Region 304

310

Span Regions 313

Input Device 311

Success Regions 312

Failure Regions 314

PATCH EXPANSION FOR SEGMENTATION NETWORK TRAINING

BACKGROUND

Segmentation involves selecting a portion of an image to the exclusion of the remainder. Image editing tools generally include features such as click and drag selection boxes, free hand "lasso" selectors, and adjustable cropping boxes to allow for the manual segmentation of an image. Certain image editors also include automated segmentation features such as "magic wands" which automate selection of regions based on a selected sample using an analysis of texture information in the image, and "intelligent scissors" which conduct the same action but on the bases of edge contrast information in the image. Magic wands and intelligent scissor tools have a long history of integration with image editing tools and have been available in consumer-grade image editing software dating back to at least 1990. More recent developments in segmentation tools include those using an evaluation of energy distributions of the image such as the "Graph Cut" approach disclosed in Y. Boykov et al., *Interactive Graph Cuts for Optimal Boundary & Region Segmentation of Objects in N-D Images*, Proceedings of ICCV, vol. I, p. 105, Vancouver, Canada, July 2001.

In certain applications, the segmentation is semantic in that a portion of an image associated with a given meaning is segmented to the exclusion of other portions. One example of a semantic segmentation problem is segmenting the foreground of an image from the background where pixels associated with the foreground are segmented from pixels associated with the background. However, segmentation targets can include more specific targets than what is traditionally considered the foreground of an image and can include specific subjects in the image such as an individual actor, an article of clothing, a hand, or any other portion of the image with a defined semantic association. In general, the portion of the image which is not part of the subject can be referred to as the "background" in this disclosure as the background is defined with reference to the segmentation of the image as opposed to the vantage point of the image.

Segmenting can involve generating a hard mask, which labels each pixel using a one or a zero to indicate if it is part of the foreground or background, or generating an alpha mask, which labels each pixel using a value from zero to one which allows for portions of the background to appear through a foreground pixel if the foreground is moved to a different background. The "segmentation" of the image can refer to the geometric arrangement of these masks relative to the image and can be represented by the mask values mentioned above or the values of the original image.

Recent development in image segmentation has been driven by the need to extract information from images available to machine intelligence algorithms studying images on the Internet and for facilitating autonomous vehicle awareness. The most common tool used for this kind of image analysis is a convolutional neural network (CNN). A CNN is a specific example an artificial neural networks (ANNs). CNNs involve the convolution of an input image with a set of filters that are "slid around" the image data to test for a reaction from a given filter. The filters serve in place of the variable weights in the layers of a traditional ANN. A segmentation tool that utilizes this type of trained network architecture is described in V. Badrinarayanan, et al., *SegNet: A Deep Convolutional Encoder-Decoder Architecture for Robust Semantic Pixel-Wise Labelling*, CVPR' 15, 1468, Nov. 14, 2014.

FIG. 1 includes a portrait 100 which is being segmented by a CNN 120 into a hard mask 110. The CNN 120 includes an encoder section 121 and a decoder section 122. The CNN operates on sub-units of the input image which are equal in size to the input size of the CNN. In the illustrated case, CNN 120 generates output 111 using input 101. Input 101 can be a grey scale or RGB encoding 102 in which each pixel value is represented by one or more numerical values used to render the image. Output 111 can be a hard mask encoding 112 in which each element corresponds to either a 1 or a 0. As illustrated, the hard mask values can be set to 1 in the foreground and 0 in the background. Subsequently, when the Hadamard product of the mask 112 and image encoding 102 is calculated, all the background pixels will be set to zero and all the foreground pixels will retain their original values in the image encoding 102. As such, the hard mask can be used to segment the foreground of the original image from the background The networks mentioned above can be trained via supervised learning in which a large amount of training data entries, each of which includes a ground truth solution to a segmentation problem along with corresponding image data, are fed into the network until the network is ultimately able to execute analogous segmentation problems using only raw image data. The training process involves iteratively adjusting the weights of the network (e.g., filter values in the case of CNNs). The result is a trained network capable of identifying a specific target such as "cats" or "pedestrian" in any image provided as an input to the network.

SUMMARY

This disclosure is directed to segmentation using trained segmentation networks. This disclosure is also directed to methods for synthesizing training data to be used to train such segmentation networks. The segmentation can be used to segment a frame. The frame can be a single image from a scene comprising a series of frames. The networks can be directed graph function approximators with adjustable internal variables that affect the output generated from a given input. The networks can be deep nets. The adjustable internal variables can be adjusted using back-propagation and a supervised learning training routine. The networks can be artificial neural networks (ANNs) such as convolutional neural networks (CNNs). The frame can be made up of many primary elements. For example, the frame can be a large two-dimensional matrix of pixel values, where the pixels and pixel values form the primary elements of the frame. The pixel values can be standard RGB or grey scale values, but they can also include additional information such as depth information, surface information, and can generally be hyperspectral encodings. For example, the frame could be a 2.5-dimensional RGB depth cloud encoded by RGB-D pixel values.

While ANNs and associated approaches have unlocked entirely new areas of human technical endeavor and have led to advancements in fields such as image and speech recognition, they are often limited by a lack of access to solid training data. ANNs are often trained using a supervised learning approach in which the network must be fed tagged training data with one portion of the training data set being a network input and one portion of the training data set being a ground truth inference that should be drawn from that input. The ground truth inference can be referred to as the supervisor of the training data set. However, obtaining large amounts of such data sets can be difficult. In the specific case of frame segmentation, it can be difficult to obtain the necessary amount of tagged training data for a supervised learning routine for each of the primary elements in the frame (e.g., marking each pixel in an image as either part of the subject or part of the background can take a large amount of time).

Considering the above, this disclosure includes systems and methods for synthesizing a large volume of training data to train a segmentation network using a limited amount of human effort and computational resources. In specific embodiments of the invention, this rapid generation of useful training data is available because the data is being generated to over train a segmentation network for a specific frame, scene, or set. As used in this disclosure, overtraining refers to a known, and usually undesirable, occurrence in which a trainable directed graph has been trained so much on a given set of test data that it will no longer function as desired when applied to a generalized set of raw data. However, specific embodiments disclosed herein are not in accordance with standard methodologies in this regard, and overtraining provides a benefit as opposed to a drawback.

In specific approaches disclosed herein, overtraining is not an issue because the network is not meant to be generalized. After it has segmented the frame for which training data is being synthesized, the job is done. At the same time, the specific application of segmenting a scene provides an appealing opportunity for a network that is over trained on a given frame. Due to the likelihood of a low statistical variation between the frames in a scene, a network that would traditionally be considered over trained on a frame can still, if trained using training data synthesized using the approaches disclosed herein, function to accurately segment additional frames in the same scene. In particular, sets (such as a broadcast studio) and fixed locales (such as sports fields or race tracks) present an opportunity for an over trained network on a particular frame to still function appropriately across a scene. Also, any scene where the shot stays the same while objects within the scene move presents a similar opportunity for an over trained network to function appropriately across the scene. Accordingly, the approaches disclosed herein can be used to generate training data to produce a segmentation network which will effectively change any arbitrary background or entire set into the equivalent of a "green screen" for facilitating segmentation.

In specific embodiments of the invention, a subject and a background are selected and training data is synthesized using image data associated with the subject and background. The labels for the training data are provided as a natural by-product of making the selections (i.e., since the subject and background were explicitly selected, corresponding tags can be directly assigned). The selections are essentially treated as seeds for creating different portions of the synthesized training data and ground truth labels for the synthesized training data. The synthesized training data can be a combination of subject and background textures which are each independently generated based on the selections. Since the synthesized training data is being generated based on a specific frame, the network would otherwise be in danger of being over trained for that specific frame. In many applications this is deleterious as the network is being more closely tied to the underlying patterns of a limited and nongeneralizable data set. However, in contrast to common approaches, this is not a problem when the network is being trained to segment a specific frame or scene, or to effectively transform a given set into a green screen.

In specific embodiments of the invention, a subject individually, a background individually, or the subject and background in combination are selected by a user in order to guide the synthesis of training data. These selections can be provided with reference to a frame alone or a frame with a segmentation overlain thereon. The selections can be provided explicitly for the purpose of synthesizing training data for the segmentation network. However, the selections could alternatively be correction inputs provided as part of an iterative frame segmentation procedure in which a segmentation of a given frame is continuously improved via correction inputs. For example, the subject and background could be selected in accordance with this disclosure as correction inputs are provided by a user in accordance with the disclosures of U.S. patent application Ser. Nos. 16/411,657 and 16/411,739 which have been filed concurrently herewith and are incorporated by reference herein in their entirety for all purposes. In other embodiments of the invention, the same selections are made by an automated system.

In specific embodiments of the invention, a computer implemented method is provided. The method comprises associating a first primary element from a scene with a background tag, associating a second primary element from the scene with a subject tag, generating a background texture using the first primary element, generating a subject texture using the second primary element, and combining the background texture and the subject texture into a synthesized frame. The method further comprises training a segmentation network using the background tag, the subject tag, and the synthesized frame. In specific embodiments of the invention, one or more non-transitory computer readable media are provided in which processor executable instructions for the aforementioned method are stored.

In specific embodiments of the invention, a computer-implemented method is provided. The method comprises associating a first primary element from a first frame with a background tag, associating a second primary element from the first frame with a subject tag, generating a background texture using the first primary element, generating a foreground texture using the second primary element, and combining the background texture and the foreground texture into a synthesized frame. The method also comprises training a segmentation network using the background tag, the foreground tag, and the synthesized frame. In specific embodiments of the invention, one or more non-transitory computer readable media are provided in which processor executable instructions for the aforementioned method are stored.

In specific embodiments of the invention, a computer-implemented method is provided. The method comprises associating a first primary element from a first frame with a background, associating a second primary element from the first frame with a subject, generating a background texture using the first primary element, generating a foreground texture using the second primary element. The method also comprises combining, in a synthesized frame, the background texture and the foreground texture. The method also comprises training a segmentation network using the synthesized frame. In specific embodiments of the invention, one or more non-transitory computer readable media are provided in which processor executable instructions for the aforementioned method are stored.

DETAILED DESCRIPTION

Specific methods and systems associated with segmentation networks and synthesizing training data for those segmentation networks in accordance with the summary above are provided in this section. The methods and systems disclosed in this section are nonlimiting embodiments of the invention, are provided for explanatory purposes only, and should not be used to constrict the full scope of the invention.

Figure 1:
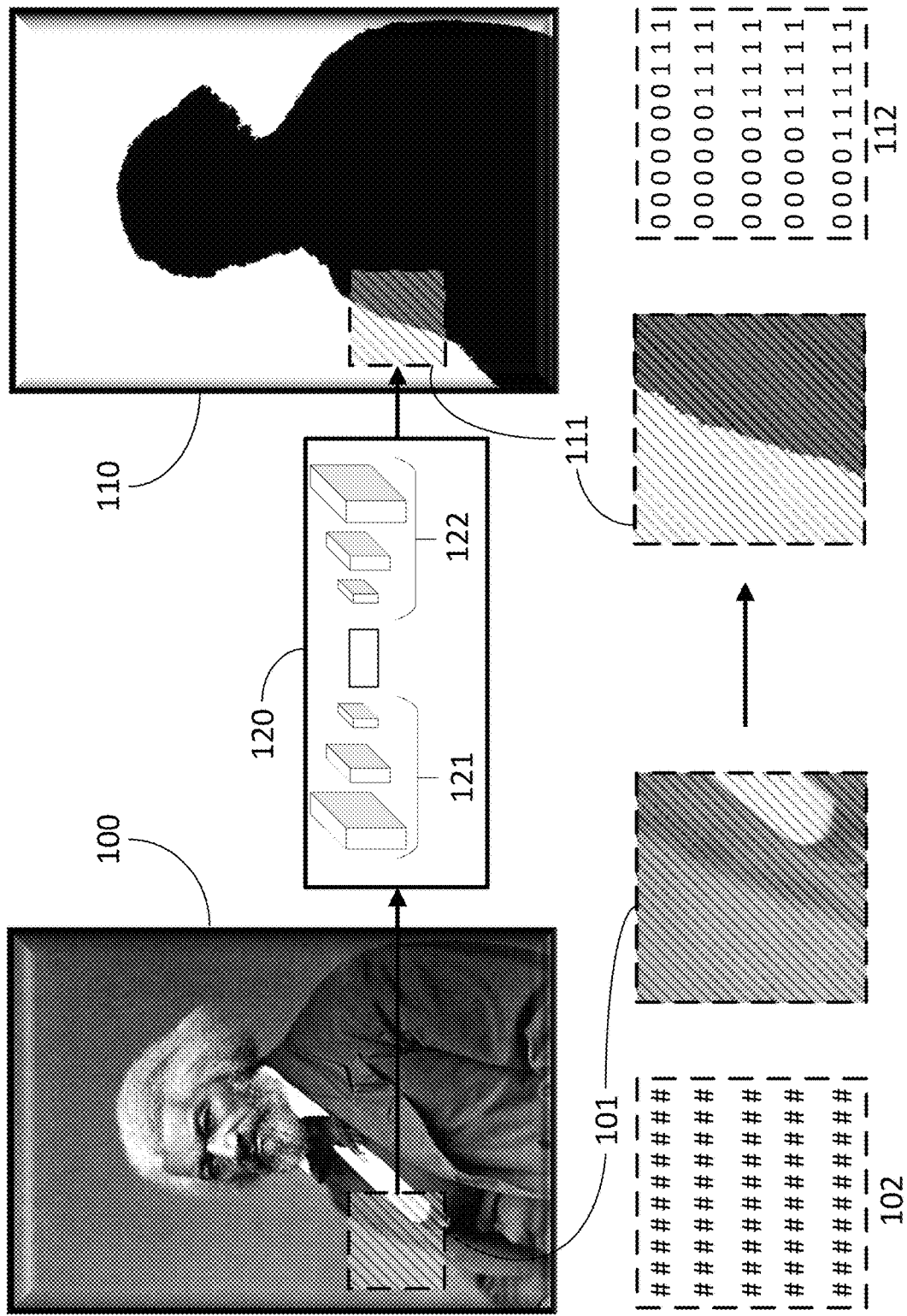
FIG. 1 is a data flow diagram illustrating the operation of an automated segmentation network in accordance the related art.
Figure 2:
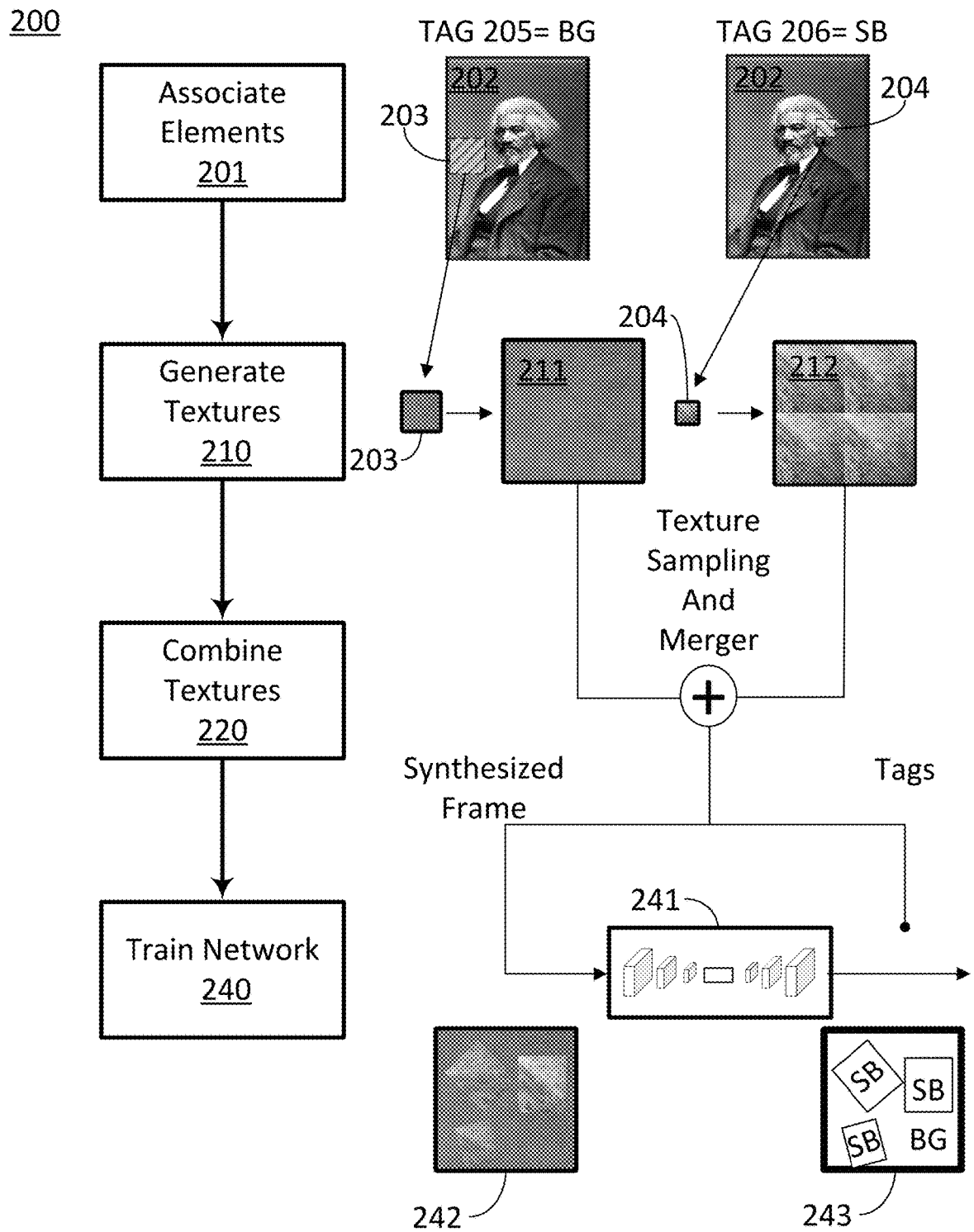
FIG. 2 is a flow chart for a set of methods for training a segmentation network using synthesized training data that is in accordance with specific embodiments of the invention disclosed herein.

FIG. 2 provides a flow chart 200 for a set of computer-implemented methods in which training data is synthesized and a network is trained using that synthesized training data. Flow chart 200 beings with a step 201 of associating elements. The elements can be primary elements of a two-dimensional image, such as pixels, or primary elements of a three-dimensional model such as voxels. The step of associating the elements can involve associating the elements with ground truth tags that identify the elements as belonging to specific portions of the image (e.g., pixel "1" is a subject pixel and pixel "2" is a background pixel). The association can be stored in memory for later use. The association can persist as the element is utilized to synthesize training data such that the tag is associated with data generated from the element, and not just the element itself.

Step 201 can involve providing a ground truth tag for elements in a frame or scene. The ground truth tag and primary element can be associated in memory. The execution of step 201 can include displaying a frame from a scene and receiving a selection directed to the frame while the frame is displayed. For example, this step can be executed by a user reviewing a frame displayed on a screen. The user could select a subject in response to a first prompt, and a background in response to a second prompt. Accordingly, the user provides an example of what the subject and background of the image look like as well as the tags for the training data that will be synthesized with those examples. Both sets of data can be utilized in accordance with the remaining steps of flow chart 200 to synthesizing training data for a segmentation network that is meant to be over trained on the frame or scene containing the elements involved in the execution of step 201.

The elements involved in the execution of step 201 can be drawn from multiple sources and be associated with various classes. The elements can be drawn from the same frame, from different frames in the same scene, or from similar scenes obtained in front of the same set. The primary elements can be associated with a background tag and a subject tag which indicates that the ground truth identifier for that primary element is background and subject respectively. However, depending on the segmentation network, there may be more associations than just background and subject as there may be multiple segmentation targets for a given frame or scene such that a more specific subject identifier must be provided to properly associate an element with ground truth. There may also be more than one association provided per element through the execution of step 201 as segmentations can involve nested classes such as identifying an element as both part of the background and within a specific class of background material such as green screen, grass, wood, curtain, etc. Likewise, an element associated with a subject can also be identified as a specific part of the subject. For example, if the subject were a person, the element could be more specifically associated with a specific class such as hand, shirt, face, etc. If the subject were an inanimate object such as a car, the element could be more specifically associated with a specific class such as body panel, wheel, or window.

Elements can be selected for association with a given tag using various approaches including manual and fully automated approaches. The selection can be made with respect to an image presented to a user on a display. The selection can also be made with respect to a segmentation overlain on the image. As such, the selection can also be made as part of an iterative process used to improve the quality of a segmentation on a given frame. The step of displaying the segmentation can involve displaying the entire segmentation or a portion thereof. The segmentation can be displayed overlaid on the frame so that the user can visually inspect the segmentation to identify potential corrections and refinements that need to be made. The segmentation can be displayed using a segmentation editor which allows the user to zoom in and out, translate, rotate, and otherwise manipulate the display of the segmentation and frame. The editor can allow the user to remove the overlaid segmentation, change the characteristics of the segmentation (e.g., alpha mask, hard mask, original image values) alter a transparency level of the overlaid segmentation, remove the background, and otherwise manipulate the relative display of the segmentation and frame prior to making their selection.

The user can be prompted to select specific portions of the frame, and optional overlaid segmentation, in order to provide the required association. The input provided in response to the prompt can be a tap or click, a scribble, click and drag polygon, a boundary, a rough path trace using a digital pen, or any other type of input required to obtain ground truth data from the user regarding the appropriate segmentation of an image. The input provided can also be a correction input directed to the segmentation which is directed to an error region of the segmentation. A user can be prompted to provide an input that specifically identifies ground truth in the original frame (i.e., "Tap Foreground Excluded from Segmentation"), so that the input can be associated with a tag matching the prompt. However, regardless of which type of input is provided by the user, the appropriate tag can be determined by the system. In effect, the step of receiving a correction input can allow the system to obtain ground truth data for conducting a supervised learning routine for the network even if the user is not intending to identify ground truth with their inputs and is instead attempting to "clean up" or otherwise edit the segmentation. In specific embodiments, the tag will be assigned to the portion of the frame to which the correction input was directed and will be a tag for the ground truth content of that portion. For example, a user may provide a tap or click on an erroneous boundary region of the segmentation to "snap" the segmentation towards the true boundary. Such an input could otherwise be used to manually clean up an automated segmentation as opposed to identifying portions of the segmentation as erroneous. However, in so doing, the system can serve to clean up the segmentation and at the same time tag the region lying between the boundary before and after the snap as ground truth background.

Figure 3:
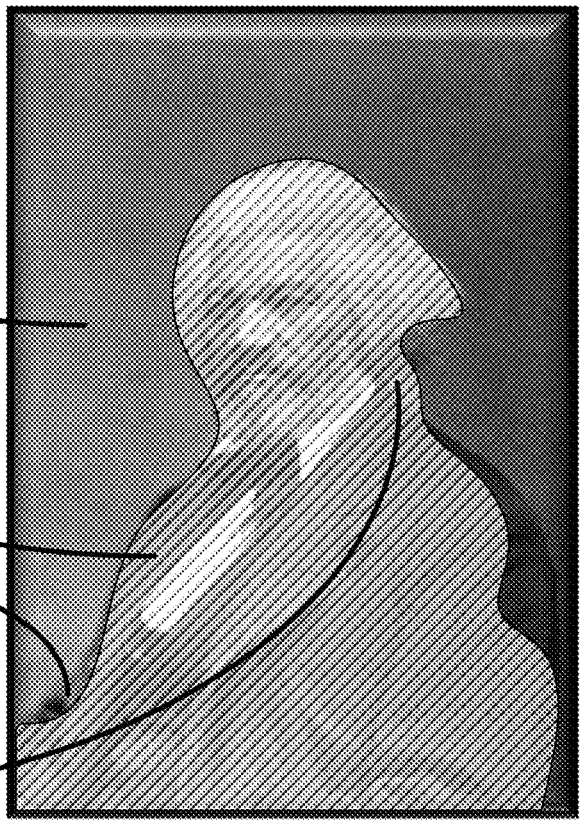
FIG. 3 is an illustration of an image with a segmentation overlain thereon to illustrate potential portions of a frame that could be selected while executing some of the methods described in FIG. 2 in accordance with specific embodiments of the invention disclosed herein.
Figure 3:
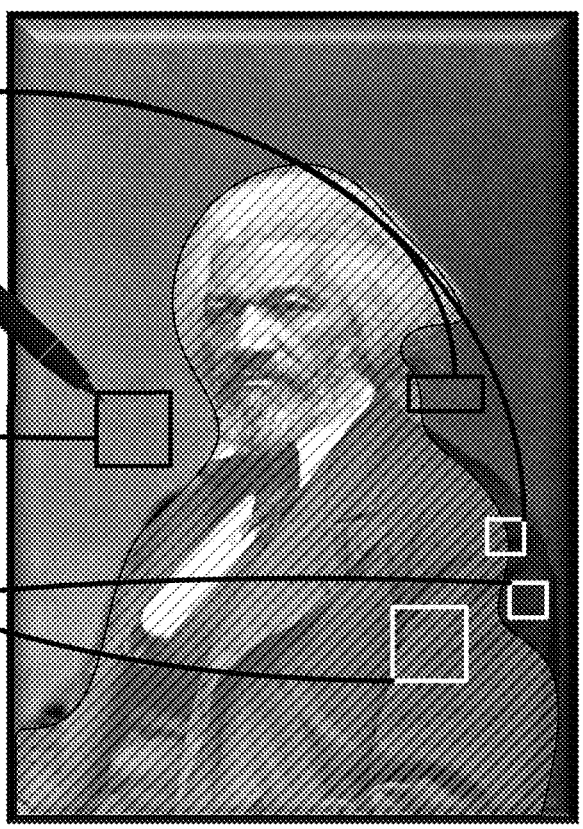

FIG. 3 provides an illustration of various ways in which step 201 can be actively conducted by a user. In particular, the figure illustrates how a user can select portions of an image to focus on areas where a segmentation network might be failing in order to generate the more effective training data. Top portion 300 illustrates an original image 301 with a segmentation 302 overlain thereon with a set level of transparency to allow a user to inspect segmentation 302 relative to image 301. The original image 301 and segmentation 302 can be displayed in a segmentation editor. As illustrated, segmentation 302 includes under segmentation error regions such as 303 where portions of the subject were erroneously excluded from segmentation 302, and over segmentation error regions such as 304 where portions of the background were erroneously included in segmentation 302. A user can generally be guided to select specific portions of the image via the display of a prompt to the user (e.g., "Select Pixels on the Subject"). However, if a user is presented with both the image and the segmentation, as in top portion 300, then they can be guided to select specific portions of the image where the segmentation has failed (e.g., "Select Pixels on the Subject Omitted from the Segmentation"). With reference to bottom portion 310, a user might select subject success regions 312 if asked to select pixels on the subject or background, or select failure region 314 if asked to select pixels on the subject omitted from segmentation.

Bottom portion 310 can be used to explain the different options a user, or automated system, has when selecting elements for association in step 201. The input device that a user will use to select pixels in FIG. 3 is a digital pen 311. However, any form of interface device used for selecting can be used instead, and automated systems will of course not need to utilize an interface device. A review of bottom portion 310 shows success regions 312 where the segmentation performed as desired. A user could select these portions of the frame when prompted. However, better training data may be provided by selecting failure regions 314 where the network completely failed to segment properly. Furthermore, span regions 313, in which the network partially succeeded and partially failed can be selected because these regions indicate that the segmentation network has not sufficiently learned the underlying textures or patterns of the image in order to properly segment the image. In particular, a user may see from inspection that the segmentation network is struggling to properly segment hair, wood, or some other texture in the image, and select primary elements of that class in order to focus on generating training data for that class. As such, providing a review of the segmentation is beneficial in that a user can determine how to guide the generation of training data by seeing how the segmentation network has failed.

In specific embodiments of the invention, step 201 will be executed by a partially or fully automated system. As an example of a partially automated system, the scene could be segmented using a segmentation network and regions in which the segmentation network was close to a decision boundary could be selected as those which should be associated with a given tag. Those portions of the image could then be displayed to the user in order to allow the user to provide the appropriate tag to be associated with the elements in that portion of the image. For example, the system could show a user sets of primary elements where the classifier was less than 80% certain as to the identify of a portion of the image and allow the user to tag those sets of primary elements manually. As another example, a network or generalized non-trainable algorithmic system could be trained to identify specific textures in an image and automatically associate them with a given tag. For example, the system could be trained to identify human hair, could select pixels in that class, and automatically associate a tag of "subject" to those pixels. The process could also be partially automated in that the association was displayed to a user, and the user was prompted to approve or reject the association. The non-trainable system could be a classifier using fixed rules regarding texture or edge variations.

In specific embodiments of the invention, a selection of a given element and the association of a tag therewith via a manual process can be propagated to additional elements via an automated process using fixed rules regarding texture or edge variations. For example, a user could select a single pixel or small region of an image and assign it a tag, and an automated system could propagate that tag to surrounding pixels that appeared to be within the same general region. A user could be presented with the scope of this propagation for review before the tag was applied, in order to serve as a double check for the automated application of the tag.

In the situation illustrated in FIG. 2, a single frame 202 is used for associating a first primary element in a bounding box 203 with a background and a second primary element in a second bounding box 204 with a foreground. In either case, the primary element is selected by a user specifying a bounding box that surrounds the primary element. Accordingly, the same ground truth tags 205 and 206 will be simultaneously associated in memory with all the primary elements in bounding box 203 and all the primary elements in bounding box 204 respectively. The user can specify a bounding box using a click and drag command with a first prompt to select a background followed by a second prompt to select a foreground. As stated previously, either one of these selections could have been conducted manually while an automated system conducts the other, both, or neither. Once the elements are associated, the flow chart can continue with the generation of synthesized training data.

In specific embodiments of the invention, once primary elements are associated with tags, the primary elements can be used to generate textures. Flow chart 200 continues with a step 210 of generating textures. The textures can be used to synthesize training data. The step can be executed using the elements selected in step 201. For example, the system could generate a texture 211 from the primary elements in bounding box 203, and a texture 212 from the primary elements in bounding box 204. Texture 211 could be a background texture while texture 212 could be a subject texture. The texture could be an up-sampled version of the primary elements. The bounding box, or another set of primary elements, can be conceptualized as a patch of the frame or scene. The texture can be generated by expanding the patch to a larger dimension. In specific embodiments, the larger dimension is larger than an input size of the segmentation network that training data is being generated for. For example, if the sets of primary elements selected in step 201 were small 100×100 pixel patches, the texture generator could replicate the patch into multiple patches and merge the replicated patches using a statistical blurring or convolutional process to prevent edge effects from aligning replicated patches. The texture could be expanded out to greater than 2N×2N in size where N×N was the input size of the segmentation network for which training data was being generated for.

In specific embodiments of the invention, once textures have been generated, the textures can be combined to form a synthesized frame. For example, the system can generate a background for the synthesized frame using a background texture, and generate a subject mask using the foreground texture. The subject mask can be filled in with the foreground texture. The subject mask can be provided from a library or provided by a user operating a mask generating tool. The mask can be a hard mask or an alpha mask. The mask can be filled in using the foreground texture. The synthesized frame can include the background and the subject mask. Furthermore, the combining step can include generating the ground truth data for the synthesized frame in order for the frame to be used in a training routine. In particular, the step of combining can include tagging the background with a background tag and tagging the subject mask with a subject tag. If multiple subject masks are included, they can each be tagged with the subject tag, or a more specific subject tag applicable to that subject mask if applicable.

Flow chart 200 continues with a step 220 of combining textures into a synthesized frame. In the illustrated case, this step involves selecting a patch of texture 211, and selecting one or more patches of texture 212, and then combining the two into a single synthesized frame 242. In the illustrated case, the patches of texture 212 are applied randomly overlain on a background that is the size of texture 211. The patches can be applied at different transformational and rotational offsets. The patches can be scaled, warped, and blurred before being combined. Different and randomized numbers and sizes of patches can be utilized. Regardless of these modifications, the system generating the frame can maintain the association between the tags from step 201 and the patches of either texture. In other words, the frame can be synthesized such that pixels generated using texture 211 are associated with a background tag while pixels generated using texture 212 are associated with a subject tag.

The synthesized frames can be further modified in order to help increase the variety and efficacy of the training data by modifying the background or subject tags. For example, modifications can be made to the ambient lighting, lighting gradients, effective camera angle, and other affine and geometric properties of the original frame from which the textures were generated. In situations in which the primary elements, and textures, also include hyperspectral, depth, or lighting surface, or geometry data, this data could likewise be modified when the textures are combined in order to increase the variety of the training data generated therefrom. For example, the reflectance values of a given surface could be smoothed out or the variance of depth values could be randomly increased across the texture. The modifications can be done to the entire frame or to the patches independently before or after they are combined. The borders between the patches of background and patches of subject can also be tweaked and modified such as via statistical blurring of elementary component values, sharpening or dulling or edge transitions, and other potential modifications. In addition, and as will be described with reference to FIG. 4, the shape of the subject and background patches can be modified from basic squares to various shapes including irregular shapes and stencils. The stencils could also include alpha mask values and the alpha values could be randomly modified as each synthesized frame was generated.

The processes used to combine the textures and synthesize frames could be fully automatic and randomized or include user modifications. The degree of user modification could be as in-depth as allowing a user to manually modify the size, rotation, scale, and overall appearance of the patches in the synthesized frame, as well as any of the other variables and modifications mentioned above. However, as many synthesized frames will be generated, in other approaches the process is kept mainly autonomous, and a user will instead be given controls for controlling variables such as the degree of randomness applied by the various processes, and the ability to toggle certain kinds of variation on the synthesized frame and off (e.g., lighting modifications). The ability to toggle different kinds of modifications can be beneficial in that it allows the user to have some degree of control over how generalized they would like the trained network to be. For example, if a user was training a network to transform a given set into an effective "green screen" then changes in camera calibration properties, camera angles, and lighting modifications would be included in the frame synthesis. However, if the user was training the network to effectively segment many frames from a prerecorded scene, then types of modifications would be less important and the user could turn those modifications off when generating the training data.

Although FIG. 2 illustrates a situation in which two textures are combined to form synthesized data, a larger number of textures could be combined instead. In particular, a user could select multiple primary elements of a subject in step 201, and each of those variant elements could be used to form a separate texture. The step of combining the textures could then involve random combinations of patches drawn from those multiple textures. In keeping with the illustrated example, a user could determine that the network needed to focus more on both the subject's skin and hair, and select according elements from both classes in step 201. The synthesized frames could then include patches drawn from both a subject skin and subject hair texture. In specific embodiments, selections from the variant subject textures would also be randomized such that subset of generated frames included only one or the other texture.

Flow chart 200 continues with a step 240 of training a segmentation network using the tags and a synthesized frame. Although only a single frame is shown in FIG. 2, many frames, on the order of hundreds or thousands, could be synthesized using a single frame in accordance with the random processes discussed above. In the illustrated case, segmentation network 241 is trained using synthesized frame 242. The synthesized frame includes three patches drawn from texture 212 which have been subjected to different levels of zoom, stretched to different sizes, and randomly rotated, before being placed on a large patch of texture 211. Since the system has full control over the synthesized data and keeps track of which texture was drawn from in order to produce the synthesized frame, the tags from step 201 are associated with specific primary elements of synthesized frame 242 which can therefore be used as part of a supervised training routine for network 241. For example, synthesized frame 242 can be applied as an input to network 241, and an output generated from that application can then be compared to ground truth tags 243 to guide a back propagation process which updates the weights in network 241.

After synthesized training data has been used to train a segmentation network, the segmentation network can be used to segment a frame from a scene. The primary elements used to generate the synthesized training data could be from alternative frames in the scene. In other words, the process of synthesizing training data and training the network could be conducted with respect to a single frame in a scene, after which the same network could be applied to segment all the other frames in the scene. As such, the time spent training the network, or overtraining the network, on that original frame provides dividends in that it can now segment all the other myriad frames in the scene. In specific embodiments, the primary elements 203 and 204 can be from different frames in the same scene. For example, a user may be able to preview the entire scene with a potential segmentation overlain thereon, and the user might be able to select subject and background primary elements across the frames as they are previewing.

In specific embodiments of the invention, a subject texture will be combined with a background texture using a subject specific mask. In these embodiments, the mask shape which is used to apply a subject texture to a synthesized frame can comprise a geometric arrangement like that of common subjects of a given class that need to be segmented from an image. For example, a mask may be in the shape of a hand, face, shirt, or other item that usually has a given texture and appears in a frame. These kinds of approaches can be useful in that the network is able to learn that a given texture is commonly associated with a given geometry and the learned correlation between the two can be used to more accurately segment the subject in any given scene.

The specific mask selected for generating a synthesized frame can be based on an identification of the subject texture. The identification can be manual or automated. For example, a user can be provided with access to a mask dictionary and in turn provide a selection for the mask. The mask dictionary could be searchable by key words and present the user with potential masks in response thereto. The system can then receive the selection of a mask and apply the subject texture to the mask in accordance with the user's instructions. Alternatively, an automated system could identify the texture and select a fitting mask based on that identity. For example, a mask dictionary could be indexed by a set of subject identifiers. The indexing could be in a one to many correspondence in either direction (e.g., the identifier "hair" could be indexed to one or more masks, and the identifiers "shirt", "dress" and "pants" could be indexed to a single mask). The selection of a corresponding mask could be conducted at random. For example, a classifier could be used to generate a subject identifier for a given foreground texture. The subject identifier could then be used to randomly select one mask indexed by that subject identifier using the subject identifier. The texture could be identified as "hair" and one of the hair masks from the mask dictionary could be selected as the mask for synthesizing the training frame.

Figure 4:
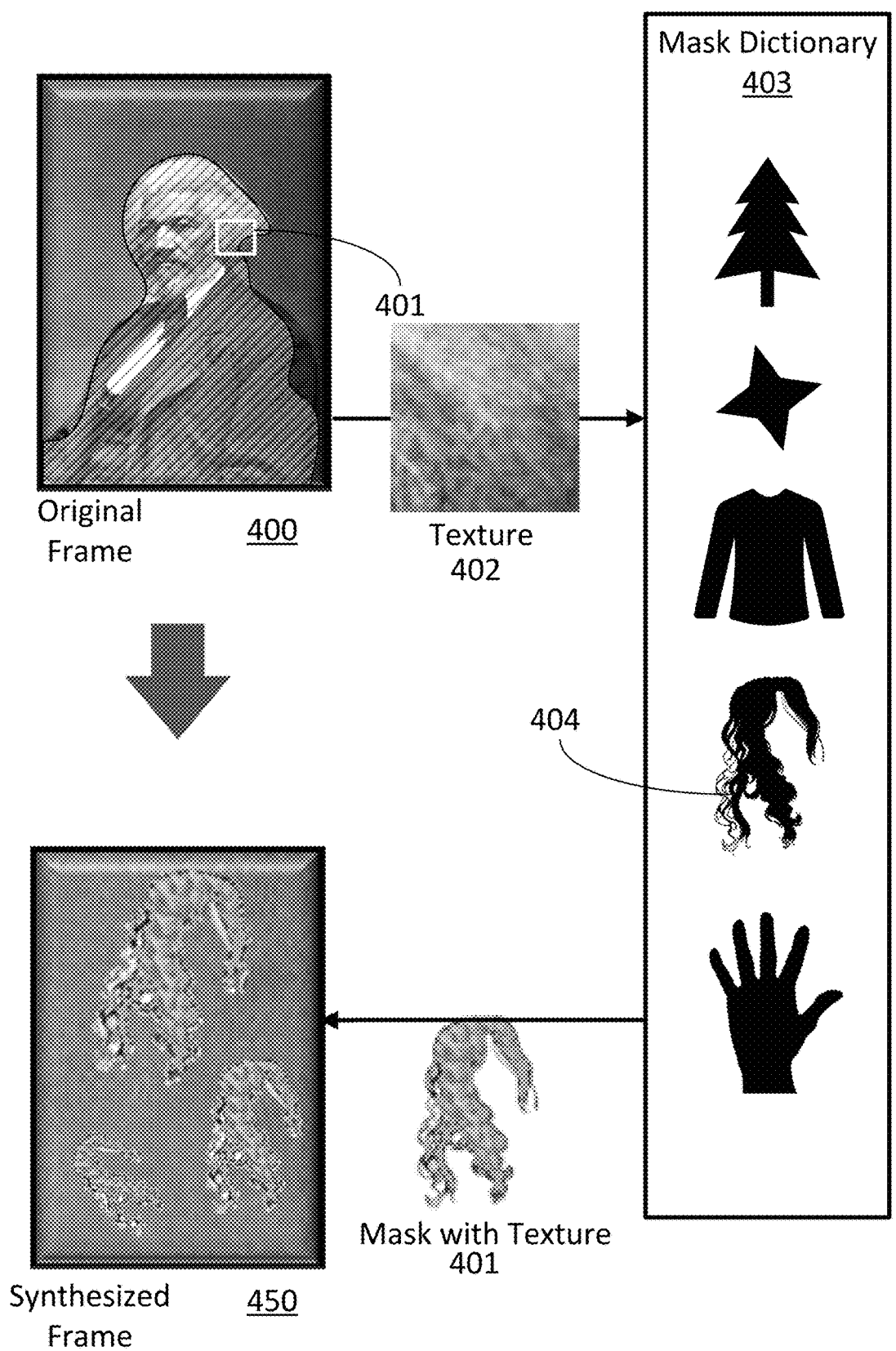
FIG. 4 is a data flow diagram for a specific approach to executing some of the methods described in FIG. 2 in accordance with specific embodiments of the invention disclosed herein.

FIG. 4 is a data flow diagram for a specific embodiment in which a synthesized frame 450 can be generated from an original frame 400. In FIG. 4, a user or automated system associates primary elements in region 401 with a subject tag. The primary elements in region 401 are then used to generate a texture 402. Subsequently, the texture is identified using a classifier. Alternatively, the texture can be manually identified by a user. In a hybrid approach, the texture can be automatically identifier by the system and a collection of choices can be presented to the user to confirm the appropriate identification. Example of the texture identification include human hair, wood, skin, curtain, a hand, a shirt, a tree, etc. The identity of the texture will then be used to pull an appropriate mask from a mask dictionary such as mask dictionary 403. In the illustrated case, it is determined that texture 402 corresponds to human hair, and a human hair mask 404 is subsequently pulled from dictionary 403. The mask is then filled with a sample from texture 402 to form a subject shape for the synthesized frame. The subject shape can then be assigned to the synthesized frame using various transpositions, rotations, resizing processes, and other modifications as mentioned above. In the illustrated case, filled mask 405 is rotated and stamped around the synthesized frame 450. The synthesized frame is then queued up to focus the network on learning how to segment hair from this particular background. The network can thereby focus on areas that the user believed required more focus.

Figure 5:
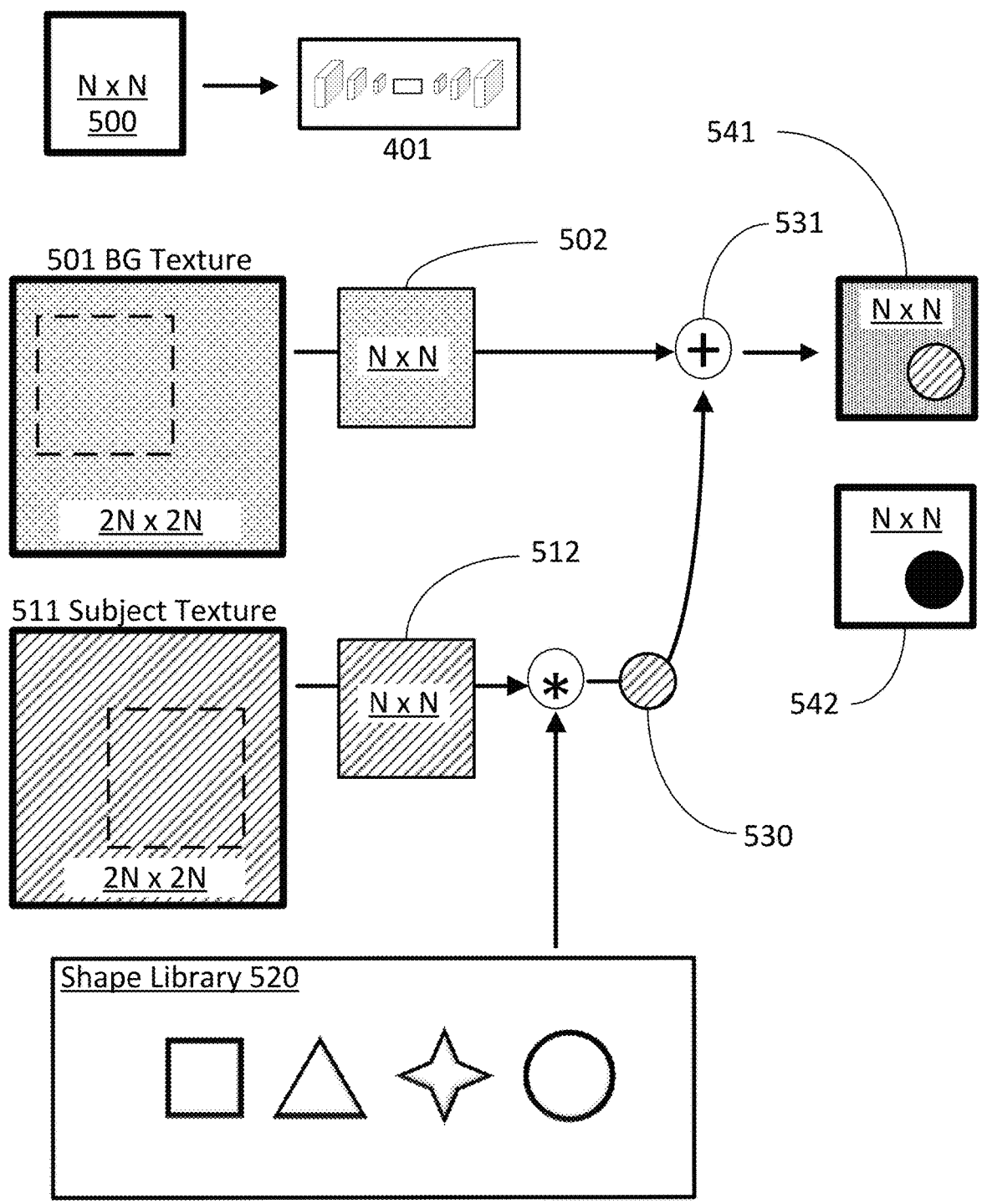
FIG. 5 is a data flow diagram illustrating the relative sizes of the textures and frames in some of the methods descried in FIG. 2 in accordance with specific embodiments of the invention disclosed herein.

FIG. 5 is a data flow diagram for a specific embodiment of the embodiment which illustrates a potential relative size of the textures, primary elements, and frames. Tile 500 references an N pixel×N pixel encoding of a portion of a frame. For example, the frame itself could be a 10N pixel× 10N pixel image encoding. The N pixel×N pixel size is selected because it is the input size of segmentation network 401. After associating specific primary elements within tile 500 with the subject and foreground, the system could generate background texture 501 and subject texture 511. The generating of the background texture and the generating of the subject texture could include defining a patch from the scene, wherein the patch includes the primary element selected from the frame, and expanding the patch to a larger dimension, wherein the larger dimension is larger than an input size for the segmentation network. As illustrated, the textures are 2N pixel×2N pixel data structures generated using the approaches described above with reference to step 210 of flow chart 200. The textures could have even larger dimensions, but the efficacy of size increases will be limited by how many primary elements were selected from the original frame to generate the texture and the variation of pixel values in the patch. For example, in the extreme case of only a single pixel being selected, increasing the size of the texture will have no effect on the efficacy of the training data synthesized therefrom.

The remaining steps in the dataflow diagram of FIG. 5 illustrate a particular manner of executing step 220. As illustrated, two tiles of size N pixel×N pixel are randomly sampled from background texture 501 and subject texture 511. The sampling is random in that the center position of the tile relative to the texture is randomized. The data structure comprising the textures is larger than the tile size to facilitate this randomization. The generation of the tiles can wrap from one end of the texture to the other to assure that any position in the texture data structure can be selected as the center point of the tile for purposes of sampling. The subject tile 512 can then be used to fill a mask selected from shape library 520. In this case, the filled mask 530 is a circle. The mask selection can be random, or it can be based on an identification of texture 511. Furthermore, the mask can be used to directly sample texture 511 without the need to generate subject tile 511. The filled mask 530 can then be combined directly with background tile 502 in a step 531 which can include a random application of filled mask 530 to a location within the bounds of tile 502. The resulting synthesized tile 541 will be an N pixel×N pixel data structure ready for application to network 401 in order to be utilized in a training routine with ground truth tile 542. The ground truth tile 542 can be generated at the same time as synthesized tile 541 as soon as the random processes of FIG. 5 up through step 531 have been executed and the content of synthesized tile 541 is known.

While the specification has been described in detail with respect to specific embodiments of the invention, it will be appreciated that those skilled in the art, upon attaining an understanding of the foregoing, may readily conceive of alterations to, variations of, and equivalents to these embodiments. While the example of a two-dimensioned scene was used throughout this disclosure, the disclosure is equally applicable to segment three dimensional frames where the elementary elements of the frame are three-dimensional voxels as opposed to pixels. Any of the method steps discussed above can be conducted by a processor operating with a computer-readable non-transitory medium storing instructions for those method steps. The computer-readable medium may be memory within a personal user device or a network accessible memory. Modifications and variations to the present invention may be practiced by those skilled in the art, without departing from the scope of the present invention, which is more particularly set forth in the appended claims.

What is claimed is:

1. A computer-implemented method comprising:
associating a first primary element from a scene with a background tag;
associating a second primary element from the scene with a subject tag;
generating a background texture using the first primary element, wherein the generating the background texture includes:
defining a first patch of the scene, wherein the patch includes the first primary element; and
expand the first patch to a larger dimension, wherein the larger dimension is larger than an input size of a segmentation network;
generating a subject texture using the second primary element;
combining the background texture and the subject texture into a synthesized frame; and
training a segmentation network using the background tag, the subject tag, and the synthesized frame.

2. The computer-implemented method of claim 1, further comprising: after the training of the segmentation network, segmenting a first frame from the scene using the segmentation network, wherein the first primary element is a first pixel from a second frame from the scene, and wherein the second primary element is a second pixel from the second frame from the scene.

3. The computer-implemented method of claim 1, wherein the associating steps comprise:
displaying a frame from the scene; and
receiving a selection directed to the frame while the frame is displayed.

4. The computer-implemented method of claim 1, wherein the generating of the background texture step comprises:
defining a patch from the scene, wherein the patch includes the first primary element; and
expanding the patch to a larger dimension, wherein the larger dimension is larger than an input size for the segmentation network.

5. The computer-implemented method of claim 1, wherein the generating of the subject texture step comprises:
defining a patch from the scene, wherein the patch includes the second primary element; and
expanding the patch to a larger dimension, wherein the larger dimension is larger than an input size of the segmentation network.

6. The computer-implemented method of claim 1, wherein the combining step comprises:
generating a background for the synthesized frame using the background texture; and
generating a subject mask for the synthesized frame using the subject texture, wherein the synthesized frame includes the background and the subject mask.

7. The computer-implemented method of claim 6, wherein the combining step further comprises:
tagging the background using the background tag; and
tagging the subject mask with the subject tag.

8. The computer-implemented method of claim 7, wherein:
the segmentation network is a convolutional neural network;
the tagging steps make the synthesized frame a supervisor for a training routine; and
the training the segmentation network step uses the background tag and the subject tag in that the supervisor is labeled using the background tag and the subject tag.

9. The computer-implemented method of claim 6, wherein the generating the subject mask comprises:
providing a mask for the subject; and
filling the mask using the subject texture.

10. The computer-implemented method of claim 9, wherein:
the mask is an alpha mask;
the first primary element is a first pixel; and
the second primary element is a second pixel.

11. The computer-implemented method of claim 9, wherein the providing the mask for the subject comprises:
providing a mask dictionary; and
receiving a selection of the mask from the mask dictionary.

12. The computer-implemented method of claim 9, wherein the providing the mask for the subject comprises:
providing a mask dictionary, wherein the mask dictionary is indexed by a set of subject identifiers;
identifying the subject using a classifier and the subject texture, wherein the identifying produces a subject identifier; and
selecting the mask from the mask dictionary using the subject identifier.

13. A computer-implemented method comprising:
associating a first primary element from a first frame in a scene with a background tag;
associating a second primary element from the first frame with a subject tag;
generating a background texture using the first primary element, the generating of the background texture includes:
defining a first patch from the first frame, wherein the first patch includes the first primary element; and
expanding the first patch to a larger dimension, wherein the larger dimension is larger than an input size for a segmentation network;
generating a foreground texture using the second primary element;
combining the background texture and the foreground texture into a synthesized frame; and
training a segmentation network using the background tag, the subject tag, and the synthesized frame.

14. The computer-implemented method of claim 13, further comprising:
training the segmentation network using the background tag, the subject tag, and the synthesized frame; and
after the training of the segmentation network, segmenting a second frame using the segmentation network, wherein the second frame is from the scene.

15. The computer-implemented method of claim 14, wherein the associating the first primary element step comprise:
displaying the first frame from the scene; and
receiving a selection directed to the first frame while the first frame is displayed.

16. The computer-implemented method of claim 14, wherein the generating of the subject texture step comprises:
defining a patch from the first frame, wherein the patch includes the second primary element; and
expanding the patch to a larger dimension, wherein the larger dimension is larger than an input size of the segmentation network.

17. The computer-implemented method of claim 13, wherein the combining step comprises:
generating a background for the synthesized frame using the background texture; and
generating a subject mask for the synthesized frame using the foreground texture, wherein the synthesized frame includes the background and the subject mask.

18. The computer-implemented method of claim 17, wherein the combining step further comprises:
tagging the background using the background tag; and
tagging the subject mask with the subject tag.

19. The computer-implemented method of claim 18, wherein:
the segmentation network is a convolutional neural network;
the tagging steps make the synthesized frame a supervisor for a training routine; and
the training the segmentation network step uses the background tag and the subject tag in that the supervisor is labeled using the background tag and the subject tag.

20. The computer-implemented method of claim 17, wherein the generating the subject mask comprises:
providing a mask for the subject; and
filling the mask using the foreground texture.

21. The computer-implemented method of claim 20, wherein:
the mask is an alpha mask;
the first primary element is a first pixel; and
the second primary element is a second pixel.

22. The computer-implemented method of claim 20, wherein the providing the mask for the subject comprises:
providing a mask dictionary; and
receiving a selection of the mask from the mask dictionary.

23. The computer-implemented method of claim 20, wherein the providing the mask for the subject comprises:
providing a mask dictionary, wherein the mask dictionary is indexed by a set of subject identifiers;
identifying the subject using a classifier and the foreground texture, wherein the identifying produces a subject identifier; and
selecting the mask from the mask dictionary using the subject identifier.

24. A computer-implemented method comprising:
associating a first primary element from a first frame in a scene with a background;
associating a second primary element from the first frame with a subject;
generating a background texture using the first primary element, wherein the generating the background texture includes:
defining a first patch of the first frame, wherein the patch includes the first primary element; and
expand the first patch to a larger dimension, wherein the larger dimension is larger than an input size of a segmentation network;
generating a foreground texture using the second primary element;
combining, in a synthesized frame, the background texture and the foreground texture; and
training a segmentation network using the synthesized frame.

25. The computer-implemented method of claim 24, further comprising:
after the training of the segmentation network, segmenting a second frame using the segmentation network, wherein the second frame is from the scene.

26. The computer-implemented method of claim 25, wherein the associating the first primary element step comprise:
displaying the first frame from the scene; and
receiving a selection directed to the first frame while the first frame is displayed.

27. The computer-implemented method of claim 24, wherein the combining step comprises:
generating a background for the synthesized frame using the background texture; and
generating a subject mask for the synthesized frame using the foreground texture,
wherein the synthesized frame includes the background and the subject mask.

28. The computer-implemented method of claim 27, wherein the generating the subject mask comprises:
providing a mask for the subject; and
filling the mask using the foreground texture.

29. The computer-implemented method of claim 28, wherein the providing the mask for the subject comprises:
providing a mask dictionary; and
receiving a selection of the mask from the mask dictionary.

30. The computer-implemented method of claim 28, wherein the providing the mask for the subject comprises:
providing a mask dictionary, wherein the mask dictionary is indexed by a set of subject identifiers;
identifying the subject using a classifier and the foreground texture, wherein the identifying produces a subject identifier; and
selecting the mask from the mask dictionary using the subject identifier.

* * * * *